United States Patent [19] [11] 4,442,472
Pang et al. [45] Apr. 10, 1984

[54] SOLID STATE TRIP CIRCUIT WITH DIGITAL TIMER

[75] Inventors: Peter N. C. Pang, Lawrenceville, Ga.; Boris Rozhansky, Skokie, Ill.

[73] Assignee: Siemens-Allis, Inc., Atlanta, Ga.

[21] Appl. No.: 362,431

[22] Filed: Mar. 26, 1982

[51] Int. Cl.³ .............................................. H02H 7/26
[52] U.S. Cl. ...................................... 361/96; 361/95; 361/97
[58] Field of Search ............................ 361/95, 96, 97

[56] References Cited

U.S. PATENT DOCUMENTS 4,149,210 4/1979 Wilson ................................. 361/95
4,347,541 8/1982 Chen et al. ....................... 361/96 X

FOREIGN PATENT DOCUMENTS 67869 6/1974 Australia ............................. 361/96
984498 2/1976 Canada ................................. 361/97
1436861 5/1976 United Kingdom .

Primary Examiner—George H. Miller, Jr.
Assistant Examiner—Derek Jennings
Attorney, Agent, or Firm—John L. James

[57] ABSTRACT

An electrical circuit is provided for actuating the trip mechanism of a circuit interrupter and includes a current sensor having a pair of output terminals and designed to cooperate with at least one electrical power conductor to sense the amount of current flowing in that conductor. The circuit further includes a circuit neutral terminal. A power supply is provided having input terminals with one of the input terminals being connected to one of the output terminals of the current sensor for receiving the sensed current signal therefrom, the other of the input terminals being connected to the circuit neutral terminal. The power supply produces output power at a first voltage level during a first mode of operation of the electrical circuit and produces output power at a second voltage level during a second mode of operation of the electrical circuit, with the second voltage level being substantially higher than the first voltage level. Circuitry is connected to the circuit neutral terminal and the other of the output terminals of the current sensor for developing a voltage signal proportional to the sensed current signal. Control circuitry is provided responsive to the magnitude of the voltage signal for actuating the trip mechanism of the circuit interrupter when the current flowing in the electrical power conductor exceeds a predetermined level. When said electrical circuit is in said first mode of operation, the control circuit is connected to the power supply for receiving output power at the first voltage level. When the electrical circuit is in the second mode of operation, the control circuit is connected to the power supply circuit for receiving output power at the second voltage level. The control circuit further includes at least one amplifier circuit for amplifying the voltage signal to a desired level. The amplifier circuit includes a gain changing circuit to adjust the level at which the trip mechanism will be actuated. The control circuit further includes a digital timing circuit having a first signal producing circuit responsive to the magnitude of the voltage of the signal received at the input terminal of the timing circuit for producing pulses having a first frequency. The timing circuit further includes a second signal producing circuit responsive to the magnitude of the voltage of the signal received at the input terminal of the timing circuit for producing pulses having a second frequency. A gate circuit is connected to the first and second signal producing circuits for producing output pulses only when receiving pulses from both the first and second signal producing circuits. A counting circuit is connected to the gate circuit for counting the number of the output pulses whenever the magnitude of the voltage at the input terminal exceeds a predetermined level.

57 Claims, 13 Drawing Figures

SOLID STATE TRIP CIRCUIT WITH DIGITAL TIMER

BACKGROUND OF THE INVENTION

This invention relates generally to circuit protection apparatus and more particularly to an improved solid state trip circuit for controlling the operation of a circuit interrupter.

It has been known for many years that molded case circuit breakers may utilize a trip mechanism including both electromagnetic and electrothermal devices for initiating the mechanical separation of its current-carrying contacts in response to an excessive flow of current in the circuit protected by the circuit breaker. Although such circuit breakers have operated accurately and economically up to the present date, they have suffered from the shortcomings that they are not easily adjustable to change tripping levels or periods of time for response and that, therefore, they have not been easily coordinated with other circuit breakers in a multi-circuit breaker system to assure proper interplay between the various circuit breakers.

Within the last twenty years, various static overcurrent electronic relays such as those shown in U.S. Pat. Nos. 3,331,927 and 3,766,436 to Zocholl et al.; U.S. Pat. Nos. 3,573,555 and 3,327,171 to Lipnitz et al.; and U.S. Pat. No. 3,590,326 to Watson have been developed for use with large circuit breakers to electronically control the tripping of the circuit breaker. Such static overcurrent relays usually involved the use of high precision components and costly circuit design which rendered such circuits uneconomical for use in smaller circuit breakers.

However, in recent years, solid state trip circuits such as those shown in U.S. Pat. No. 3,818,275 to Shimp and U.S. Pat. No. 4,060,844 to Davis et al. have been developed specifically for use with molded case circuit breakers. These circuits have overcome the adjustability and coordination shortcomings of the aforementioned thermal-magnetic trip units, but have suffered from the shortcoming that lengthy calibration testing has been required during production to assure accurate tripping. Such calibration requirements have been both costly and time consuming.

SUMMARY OF THE INVENTION

Thus, in accordance with the present invention, an electrical circuit for actuating the trip mechanism of a circuit breaker has been provided for actuating the trip mechanism of a circuit interrupter and includes a current sensor having a pair of output terminals and designed to cooperate with at least one electrical power conductor to sense the amount of current flowing in that conductor. The circuit further includes a circuit neutral terminal. A power supply is provided having input terminals with one of the input terminals being connected to one of the output terminals of the current sensor for receiving the sensed current signal therefrom, the other of the input terminals being connected to the circuit neutral terminal. The power supply produces output power at a first voltage level during a first mode of operation of the electrical circuit and produces output power at a second voltage level during a second mode of operation of the electrical circuit, with the second voltage level being substantially higher than the first voltage level. Circuitry is connected to the circuit neutral terminal and the other of the output terminals of the current sensor for developing a voltage signal proportional to the sensed current signal. Control circuitry is provided responsive to the magnitude of the voltage signal for actuating the trip mechanism of the circuit interrupter when the current flowing in the electrical power conductor exceeds a predetermined level. When the electrical circuit is in the first mode of operation, the control circuitry is connected to the power supply for receiving output power at the first voltage level. When the electrical circuit is in the second mode of operation, the control circuitry is connected to the power supply circuit for receiving output power at the second voltage level. The control circuitry further includes at least one amplifier circuit for amplifying the voltage signal to a desired level. The amplifier circuit includes a gain changing circuit to adjust the level at which the trip mechanism will be actuated. The control circuitry further includes a digital timing circuit having a first signal producing circuit responsive to the magnitude of the voltage of the signal received at the input terminal of the timing circuit for producing pulses having a first frequency. The timing circuit further includes a second signal producing circuit responsive to the magnitude of the voltage of the signal received at the input terminal of the timing circuit for producing pulses having a second frequency. A gate circuit is connected to the first and second signal producing circuits for producing output pulses only when receiving pulses from both the first and second signal producing circuits. A counting circuit is connected to the gate circuit for counting the number of the output pulses whenever the magnitude of the voltage at the input terminal exceeds a predetermined level.

An object of the present invention is the provision of an electrical circuit for actuating the trip mechanism of a circuit interrupter which does not require any calibration.

Another object of the present invention is the provision of an electrical circuit for actuating the trip mechanism of a circuit interrupter which senses line current more accurately than circuits heretofore available.

Yet another object of the present invention is the provision of an electrical circuit for actuating the trip mechanism of a circuit interrupter in which the time delays in responding to overcurrent conditions are determined more accurately than in circuits heretofore available.

A further object of the present invention is the provision of an electrical circuit for actuating the trip mechanism of a circuit interrupter which efficiently utilizes the power available to the circuit.

Yet another object of the present invention is the provision of an electrical circuit for actuating the trip mechanism of a circuit interrupter which is relatively inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
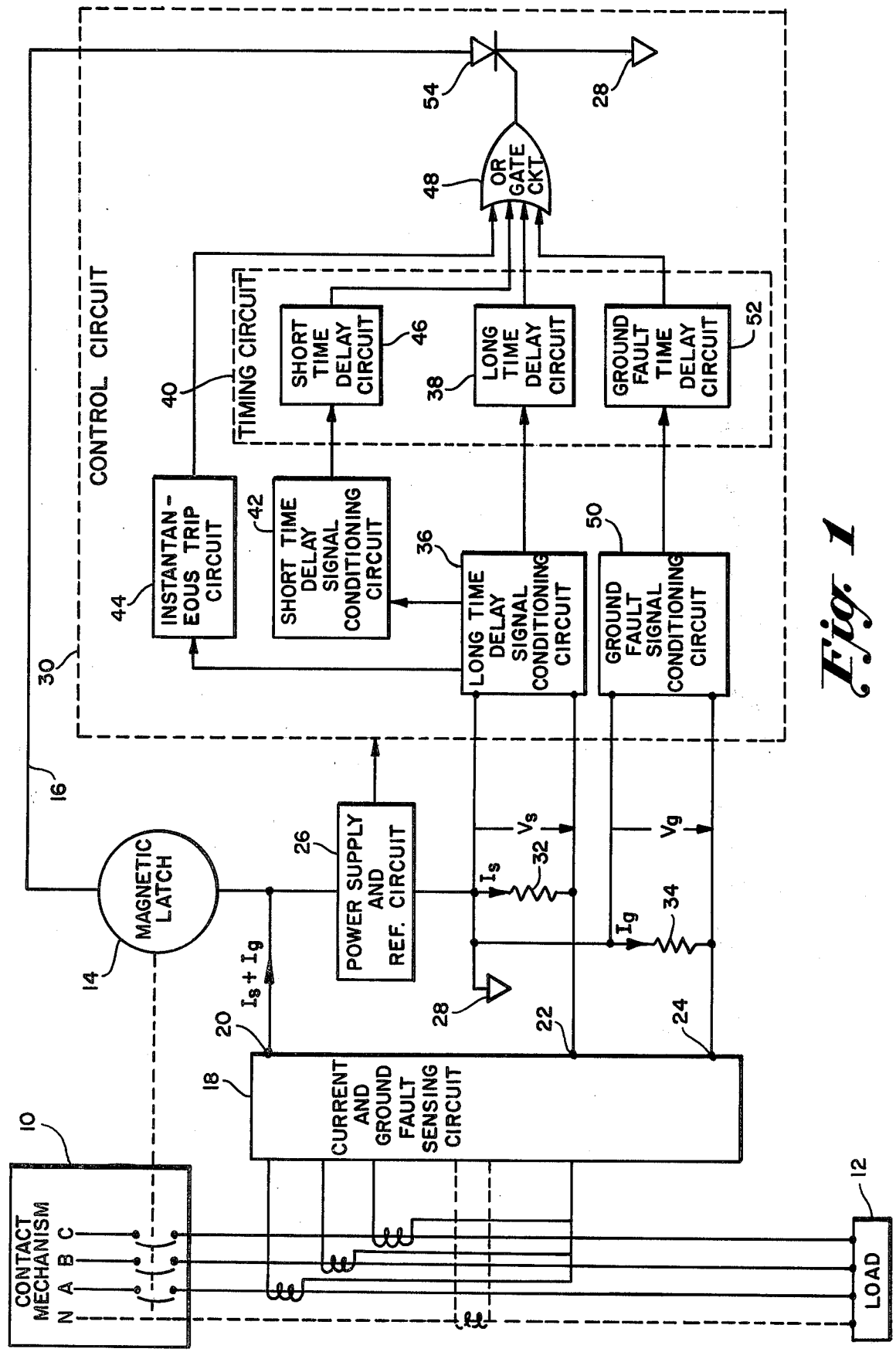
FIG. 1 shows the solid state trip circuit of the present invention in combined schematic and block diagram form.

Referring to FIG. 1, a circuit breaker (not shown) includes a contact mechanism 10 for connecting each of three power conductors A, B, and C of a three-phase power system in series with an external load 12. The contact mechanism 10 is connected to a known mechanical trip mechanism and a known manually controlled mechanism for opening and closing its contacts. A magnetic latch mechanism 14 is mechanically coupled to the contact mechanism 10 and is adapted to cause substantially simultaneous separation of the circuit breaker contacts, and hence, interruption of the currents flowing in each of conductors A, B, and C in response to a flow of sufficient operating current in electrical line 16. While the present invention is described in terms of operation in a three-phase circuit, it should be understood that the present invention is equally applicable to any power-carrying circuit having at least one conductor exclusive of any return conductor, and that the contact mechanism 10 may be of any type consistent with the current interruption requirements and the capacity to be actuated by means of a latch mechanism responsive to an electrical input.

A current and ground fault sensing circuit 18 senses the amount of current flowing in each of conductors A, B, and C (and N, if applicable) and produces a sensed current signal $I_s$ indicative thereof at output terminal 20. The current and ground fault sensing circuit further includes a return output terminal 22. The current and ground fault sensing circuit 18 also senses ground fault currents by summing the currents in conductors A, B, and C and also summing the current in the neutral conductor N, if applicable. A signal indicative of any ground fault currents $I_g$ is produced by circuit 18, is delivered at output terminal 20, and is returned to circuit 18 at output terminal 24.

The combination of the sensed current signal and the sensed ground fault current signal (if any) is delivered to a power supply and reference circuit 26. The power supply and reference circuit 26 is connected to the output terminal 20, to a circuit neutral terminal 28, and to a control circuit 30. As will be described in detail later, the power supply and reference circuit 26 produces output power at a first voltage level during a first mode of operation of the trip circuit and during this first mode provides several power and reference voltage signals to each of the circuits within the control circuit 30. During a second mode of operation of the trip circuit, the power supply and reference circuit 26 produces output power at a second voltage level substantially higher than the first voltage level.

A resistor 32 is connected to the circuit neutral terminal 28 and to the output terminal 22 of current and ground fault sensing circuit 18 for developing a voltage signal $V_s$ proportional to the sensed current signal $I_s$ and for returning substantially all of the sensed current signal to the output terminal 22. As will become even more apparent in the discussion of FIGS. 2-4 which follows, one of the particularly significant features of the present invention is the aforementioned fact that substantially all of the sensed current signal delivered from output terminal 20 is returned to terminal 22 by means of resistor 32. This occurs since virtually all the power delivered from power supply and reference circuit 26 to control circuit 30 is returned from control circuit 30 to neutral terminal 28. Virtually all of this current then flows through resistor 32 before being returned to terminal 22. In the preferred embodiment of the present invention, the circuit components utilized assure that 99.9 percent of the sensed current signal $I_s$ flowing from terminal 20 will be returned through resistor 32 to terminal 22. In a like manner, a resistor 34 is connected to the circuit neutral terminal 28 and to the terminal 24 of current and ground fault sensing circuit 18 for developing a ground fault voltage signal $V_g$ proportional to the sensed ground fault current signal $I_g$ and for returning substantially all of the sensed ground fault current signal to the terminal 24. Likewise, the circuit components utilized assure that 99.9 percent of the sensed ground fault current signal $I_g$ flowing from terminal 20 will be returned through resistor 34 to terminal 24. Since the resistors 32 and 34 are connected below the terminal 28 in a voltage sense, the voltage signal developed by resistor 32 and the ground fault voltage signal developed by resistor 34 are negative with respect to the voltage at neutral terminal 28. This means of developing control voltage signals for the control circuit 30 has eliminated any need for calibration of the circuit of the present invention.

The control circuit 30 is responsive to the voltage signal developed by resistor 32 and the ground fault voltage signal developed by resistor 34 for actuating the trip mechanism 10 when the current flowing in conductors A, B, and C or when the ground fault current exceeds predetermined levels.

The control circuit 30 includes a long time delay signal conditioning circuit 36 connected to the resistor 32 for amplifying the sensed voltage signal to a desired level, thereby adjusting the level at which the trip mechanism 10 will be actuated. Output signals developed by the long time delay signal conditioning circuit 36 are delivered to a long time delay circuit 38 which is part of a timing circuit 40, a short time delay circuit conditioning circuit 42, and an instantaneous trip circuit 44. An output from the short time delay signal conditioning circuit is delivered to a short time delay circuit 46 in timing circuit 40. The short time delay signal conditioning circuit 42 amplifies the output received from the long time delay signal conditioning circuit 36 to a desired level, to thereby adjust the level at which the short time delay circuit 46 will be actuated to effect actuation of the trip mechanism 10 in a more rapid fashion than would be provided by the long time delay circuit 38. The instantaneous trip circuit 44 bypasses the timing circuit 40 and delivers a trigger signal to OR gate 48 whenever the output of long time delay signal conditioning circuit 36 exceeds a third level, to thereby actuate trip mechanism 10 in an extremely rapid fashion.

In much the same manner, a ground fault signal conditioning circuit 50 is connected to resistor 34 for receiving the ground fault voltage signal therefrom and for amplifying the ground fault voltage signal to a desired level, thereby adjusting the level at which the trip mechanism 10 will be actuated. The ground fault signal conditioning circuit 50 delivers an output signal to a ground fault time delay circuit 52 in timing circuit 40. After predetermined time delays, as will be discussed in detail in connection with FIGS. 4, 5, and 6, the long time delay circuit 38, the short time delay circuit 46, and the ground fault time delay circuit 52 are designed to deliver trigger signals to OR gate circuit 48. OR gate circuit 48 is designed to respond to a signal from any one of instantaneous trip circuit 44, short time delay circuit 46, long time delay circuit 38, and ground fault time delay circuit 52 to deliver a gating signal to a switch 54, preferably a silicon controlled rectifier (SCR). The SCR 54 has its anode and cathode terminals in series with neutral terminal 28, power supply and reference circuit 26, and magnetic latch 14. SCR 54 is normally non-conductive. As long as SCR 54 remains non-conductive, the circuit of the present invention remains in its first mode of operation and the control circuit 30 receives power from the power supply and reference circuit 26 at the first voltage level. However, when a gating signal is received from OR gate circuit 48, SCR 54 is rendered conductive and the circuit of the present invention is placed in its second mode of operation. Power supply and reference circuit 26 then delivers power to magnetic latch 14 at said second voltage level, thereby causing magnetic latch 14 to actuate the circuit breaker mechanism 10, interrupting the flow of current in conductors A, B, and C.

Figure 2:
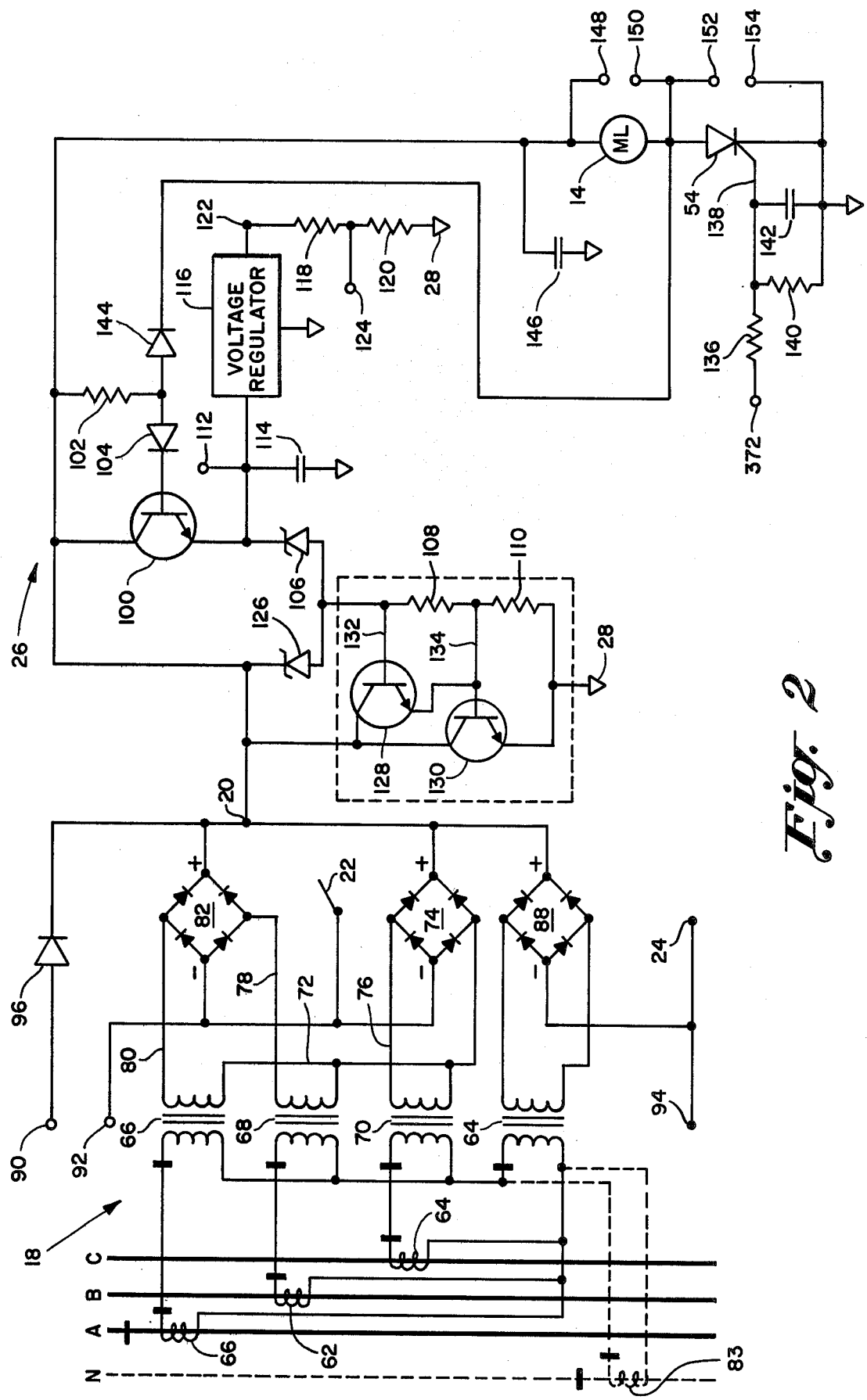
FIGS. 2, 3, and 4 show a detailed schematic circuit diagram of the solid state trip circuit of the present invention.
Figure 3:
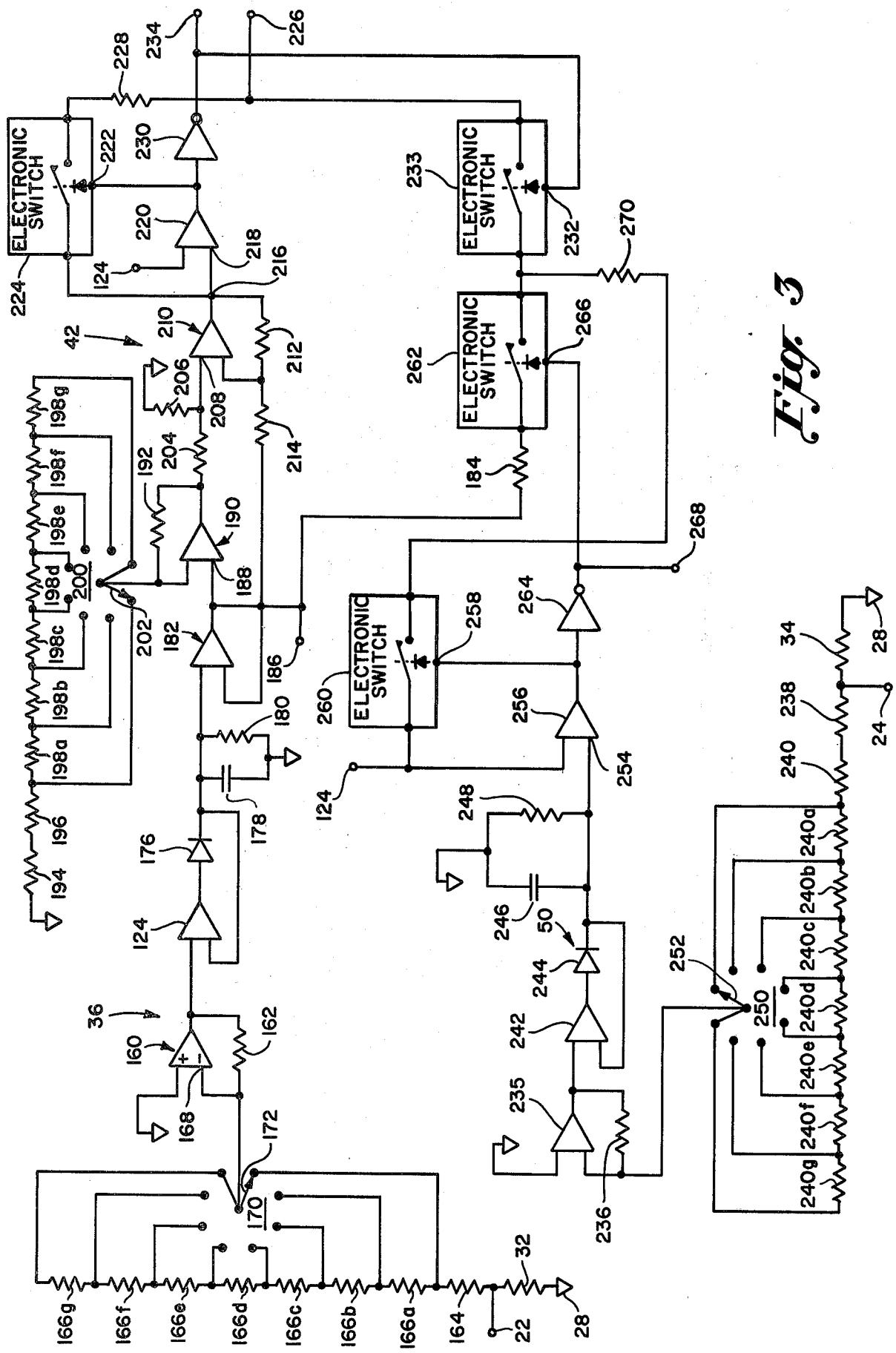
Figure 4:
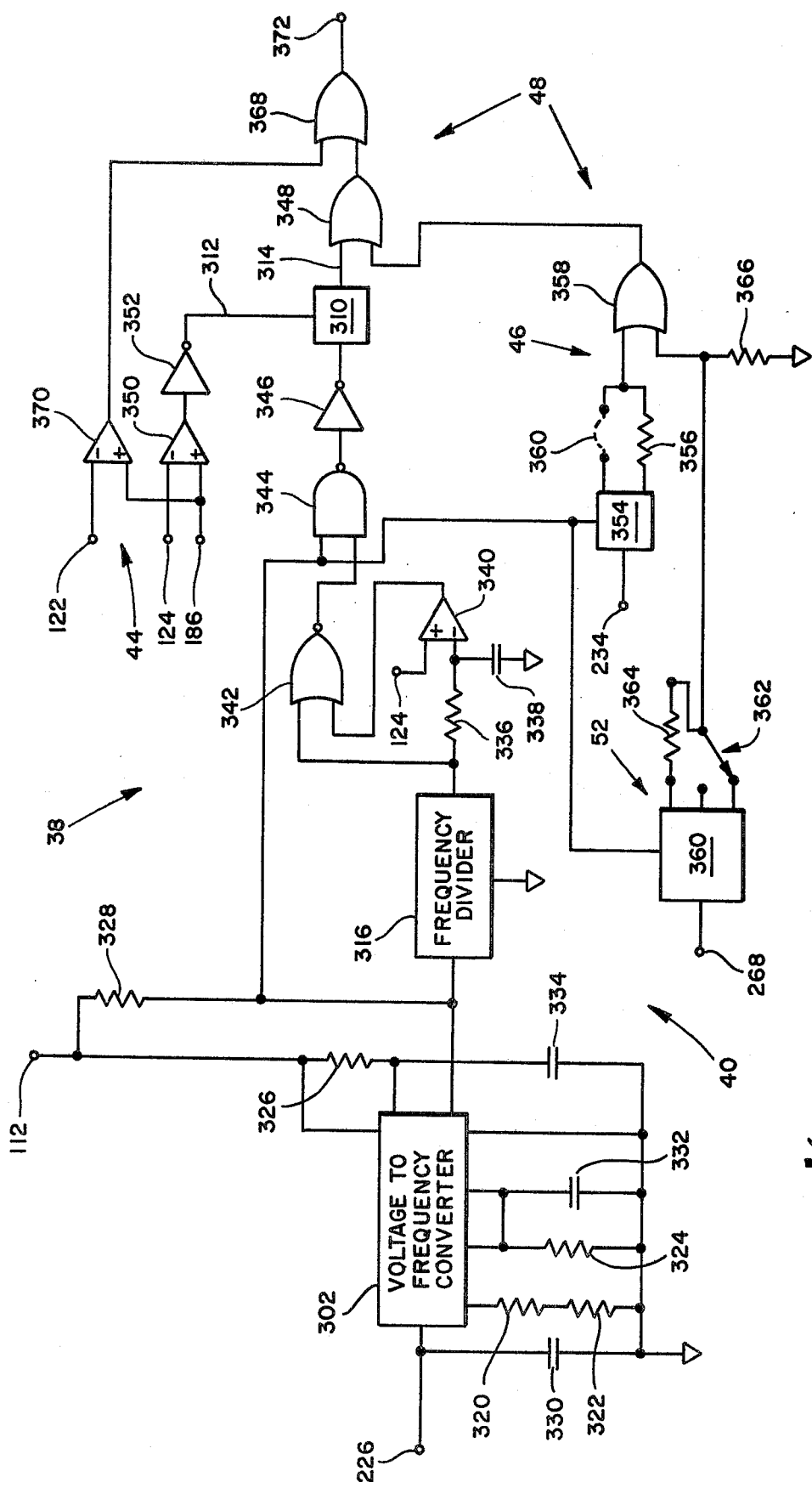

Referring to FIGS. 2–4, the circuit described in FIG. 1 will be described again in detail. The current and ground fault sensing circuit 18 includes current transformers 60, 62, and 64 in series with each of the power conductors A, B, and C, respectively. After passing through an intermediate reduction stage utilizing transformers 66, 68, and 70, the secondary windings of the transformers 66, 68, and 70 are connected together to form a common lead 72 coupled to one input of a first full wave rectifier diode bridge 74. The remaining lead 76 from the secondary winding of transformer 70 is connected to the other input terminal of diode bridge 74 and the remaining leads 78 and 80 from the secondaries of transformers 68 and 66, respectively, are connected to the inputs of another full wave rectifier diode bridge 82. The positive (+) outputs of the bridges 74 and 82 are connected together and to the positive output terminal 20 of current and ground fault sensing circuit 18. The negative (−) outputs of the diode bridges 74 and 82 are connected together and to the negative output terminal 22 of current and ground fault sensing circuit 18. In the event a four wire supply system is being utilized, an additional current transformer 83 may be added to sense any current flow in the neutral wire N.

A ground fault transformer 84 is provided for summing the currents through the transformers 66, 68, 70, and 86 (if applicable). Thus, the output from transformer 84 is zero in the absence of a ground fault occurring in one or more of conductors A, B, and C. The output leads of transformer 84 are connected to a third full wave rectifier diode bridge 88. The positive (+) output of diode bridge 88 is connected to positive output terminal 20 of current and ground fault sensing circuit 18. The negative (−) output of diode bridge 88 is connected to negative ground fault output terminal 24 of current and ground fault sensing circuit 18.

Current and ground fault sensing circuit 18 also includes test terminals 90, 92, and 94 adapted to receive test signals on either terminals 90 and 92 or terminals 90 and 94, with terminal 90 being the common or positive (+) terminal. Positive test terminal 90 is connected through a protective diode 96 to positive terminal 20 of current and ground fault sensing circuit 18. Negative test terminal 92 is connected to negative output terminal 22 of current and ground fault sensing circuit 18, and negative ground fault terminal 94 is connected to negative ground fault output terminal 24 of current and ground fault sensing circuit 18. Accordingly, in a known manner, a test current signal may be applied to terminals 90 and 92 and a test ground fault signal may be applied to terminals 90 and 94 to test the operation of the circuit of the present invention.

The instantaneous current in each power conductor A, B, and C varies as a function of phase and load. Thus, only one of the currents will be instantaneously greater than the remaining currents. The largest current, after being reduced by its corresponding current transformer and step down transformer, will flow through one of the diode bridges 74 or 82 to generate a voltage across the equivalent load between current and ground fault sensing circuit outputs 20 and 22. This voltage back-biases the diode associated with the remaining current paths through the diode bridges 74 and 82 to prevent the passage of the lesser magnitude currents generated by the remaining line currents. Thus, the signal current flowing from positive output terminal 20, disregarding any ground fault signal, will always be proportional to the highest peak current flowing in any of the power conductors A, B, and C (and N, if applicable).

Assuming the circuit of the present invention is in the quiescent state, with the contact mechanism 10 interrupting current flow in conductors A, B, and C, transistor 100 is in a non-conducting state. When the contact mechanism 10 is closed by a suitable circuit breaker mechanism (not shown), current is permitted to flow in conductors A, B, and C, and a sensed peak current signal, added to a sensed ground fault signal (if any), flows from output terminal 20 through a resistor 102 and a diode 104 to cause the transistor 100 to become conductive. When the transistor 100 begins to conduct, the sensed current signal will flow through transistor 100, a zener diode 106, resistors 108 and 110 to circuit neutral terminal 28. As was shown in FIG. 1 and as will be further discussed in connection with FIG. 3, current flows from the neutral terminal 28 through resistor 32 and back to negative output terminal 22 of current and ground fault sensing circuit 18. The zener diode 106 establishes the first or normal operating voltage of the circuit of the present invention at terminal 112. The normal operating voltage of the circuit is approximately 10 volts. A smoothing capacitor 114 is connected to terminal 112 to smooth any ripple in the supply voltage. A voltage regulator 116 is connected to terminal 112 to receive output power therefrom at the voltage level of approximately 10 volts and for producing a regulated output voltage signal at a lesser voltage of approximately 5 volts. The voltage regulator 116 can be any one of a number of known designs, for example, those generally sold under the model number µA78L05AC. A voltage divider having resistors 118 and 120 is connected between the output 122 of voltage regulator 116 and neutral terminal 28. A reference voltage terminal 124 is established at the junction of resistors 118 and 120.

A zener diode 126 is connected in parallel with the series combination of switching transistor 100 and zener diode 106. The zener diode 126 is also connected by means of resistors 108 and 110 to circuit neutral terminal 28. The zener diode 126, in combination with the resistors 108 and 110, serves to provide output power during the second mode of operation of the circuit of the present invention and a substantially higher voltage, for example, approximately 40 volts, than the voltage produced by the circuit composed of transistor 100, zener diode 106, and resistors 108 and 110 during the first mode of operation of the circuit. A Darlington pair of transistors 128 and 130 have their bases 132 and 134 connected to the voltage divider formed by resistors 108 and 110. The Darlington pair of transistors 128 and 130 serves as a shunt regulator by shunting excess current away from the first voltage supply circuit of transistor 100, zener diode 106, and resistors 108 and 110 during the first mode of operation of the circuit and shunting excess current away from the second power supply circuit of zener diode 126 and resistors 108 and 110 during the second mode of operation of the circuit of the present invention. The Darlington pair of transistors 128 and 130 are biased to the conductive state whenever current flows through resistors 108 and 110 as a result of either zener diode 106 or zener diode 126 experiencing an over-voltage condition.

The circuit enters the second mode of operation as a result of a gating signal being delivered from OR gate circuit 48 to a resistor 136 connected to gate terminal 138 of SCR 54 or the closing of a thermal switch, as hereinafter discussed. Also connected to gate 138 is an RC filter circuit composed of resistor 140 and capacitor 142. As a result of the gating signal delivered to SCR 54, SCR 54 is rendered conductive, causing current to flow in magnetic latch 14. Simultaneously, diode 144, connected to SCR 54 and to resistor 102, is forward biased into conductivity. As a result, the biasing voltage applied through diode 104 to the base of transistor 100 is removed and transistor 100 is switched to a non-conductive state. Thus, power is supplied to magnetic latch 14 by zener diode 126, resistors 108 and 110, and the Darlington pair shunt regulator 128 and 130.

A filter capacitor 146 is connected in parallel with magnetic latch 14 and SCR 54 to suppress high voltage transients and prevent nuisance turn-on or destruction of the SCR and the circuit as a whole. In addition, terminals 148 and 150 are connected to magnetic latch 14 and to a known shunt trip mechanism for actuating the contact mechanism 10 in response to an external control. Terminals 152 and 154 are connected across SCR 54 and to a known form of thermal switch (not shown, but preferably of the type sold by Midwest Components Inc. as a TS85A device) to actuate the contact mechanism 10 in response to a predetermined threshold ambient temperature, in a known fashion.

As has been discussed earlier, substantially all the sensed current flows through power supply and reference circuit 26 to neutral terminal 28 and from neutral terminal 28 through resistor 32 to terminal 22 of current and ground fault sensing circuit 18. The voltage developed at terminal 22 is a negative voltage with respect to neutral terminal 28 and is directly proportional to the sensed current signal. Also connected to resistor 32 is the long time delay signal conditioning circuit 36 including an amplifier circuit for amplifying the aforementioned voltage signal to a desired level. The amplifier circuit includes an operational amplifier 160 which, in the preferred embodiment, includes a fixed feedback resistor 162 and a plurality of input resistors 164 and 166a-166g. The input resistance 164 is always connected to negative input terminal 168 of amplifier 160 through an eight position switch 170. As is apparent from FIG. 3, the switch 170 includes a wiper 172, which, when placed in the position shown in FIG. 3, shorts the resistances 166a-166g to connect only resistance 164 between terminal 22 and terminal 168. As the wiper 172 is rotated in a clockwise direction, as shown in FIG. 3, one or more of the resistances 166a-166g may be placed in series with resistance 164 between terminals 22 and 168. It is well known in the art that the type of amplifier circuit illustrated by components 160-172 is an inverting amplifier having a gain represented as follows:

where $V_O$ = output voltage
$V_i$ = input voltage
$R_1$ = input resistance
$R_2$ = feedback resistance so that
$V_O = -R_2/R_1 V_i$ It is apparent from the above relationship and from the circuit thus far described in FIG. 3 that $R_1$ may have any one of eight discrete values; i.e. resistance 164, and resistance 164 in combination with any one or more of resistances 166a-166g. Resistance $R_2$ is represented by resistor 162 and is fixed or constant. The input voltage is the sensed voltage at terminal 22. Accordingly, in the position shown in FIG. 3, the wiper 172 connects only the resistance 164 to terminal 168 and the input resistance is the lowest, making the gain of the amplifier circuit the greatest. As the wiper 172 is rotated in a clockwise direction, the input resistance increases in discrete steps, and the gain of the amplifier circuit is correspondingly reduced in discrete steps. It should be apparent to one skilled in the art that the resistances 162, 164, and 166a-166g can be chosen to achieve a wide range of gains for amplifier 160. The circuit of the present invention is adapted to respond to the sensed voltage across resistor 32. Accordingly, the input voltage $V_i$ for the amplifier circuit 160 is the sensed voltage signal $V_s$ developed by resistor 32. The circuit is designed so that at a particular sensed voltage signal, for example 0.4 volts, the circuit reacts as if the conductors A, B, and C are carrying their maximum rated current. Accordingly, in the preferred embodiment, the resistances 162, 164, and 166a-166g are chosen so that, in the position shown in FIG. 3, the gain of amplifier 160 will be 1.0 and so that the circuit will actuate contact mechanism 10 in response to 50% of its maximum rated current. As the wiper 172 is rotated in a clockwise direction, the gain of amplifier 160 will be correspondingly reduced so that the circuit will actuate contact mechanism 10 in response to 60%, 70%, 80%, 85%, 90%, 95%, and 100%, respectively, of its maximum rated current. This occurs because the circuit responds to the output of amplifier 160, and thus, by changing the gain of the amplifier 160, the rating of the circuit may be changed. It should be further noted that since the resistors 162, 164, and 166a-166g do not carry the sensed current signal, these resistors can be of a very low power rating and a very small physical size.

Figure 3A:
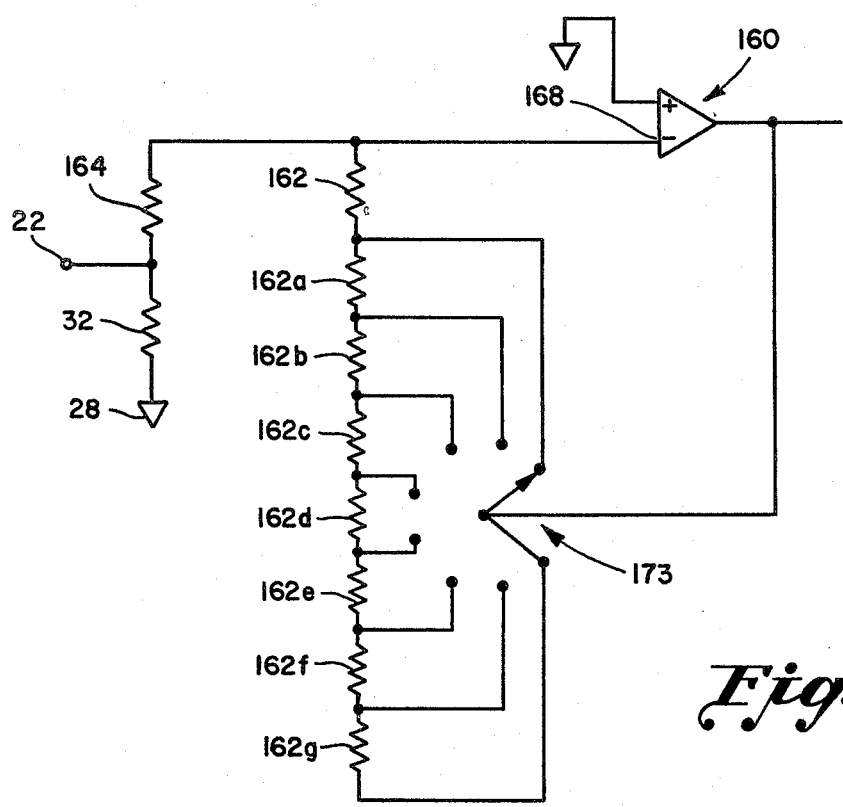
FIG. 3A shows an alternate embodiment of an amplifier circuit shown in FIG. 3.

The present invention further contemplates, as an alternative embodiment to that shown in FIG. 3, that the gain of amplifier 160 may be varied by utilizing a fixed input resistance such as resistor 164 and by placing a plurality of discrete resistances in series with resistor 162 in a switchable relationship as illustrated in FIG. 3A. With like numerals utilized to identify like components, resistances 162a–162g are selectively placed in series with resistor 162 by a switch 173. This would have the effect of varying $R_2$ in the above-noted formula instead of $R_1$. Should one employ this embodiment, it should be noted that in the event one attempted to change the position of the switch 173 while the circuit breaker was closed and on line, that the circuit would instantly cause the circuit breaker mechanism 10 to be actuated since between positions $R_2$ will be infinite, and accordingly, the amplifier 160 will have an infinite gain. It should be further understood that the present invention contemplates that either the resistance 162 or the resistance 164 could be a variable resistance without discrete positions. However, in the preferred embodiment, a discrete resistance network is chosen for greater accuracy at the eight discrete points. Furthermore, it should be understood that although switches 170 and 173 are illustrated as linear switches, the present invention contemplates the use of other types of switches such as, for example, binary coded switches.

A buffer amplifier 174 is connected to the output of amplifier 160 and in series with a diode 176 for isolating a capacitor 178 from the amplifier 160. The capacitor 178 cooperates with resistor 180 to provide two functions. The first function is that of a filter to smooth the D.C. input signal to amplifier 182. The second function is to provide a delay circuit for delaying the decay in the level of the output voltage from the amplifier 160 and thereafter buffer amplifier and diode 174 and 176 in response to a drop in the voltage signal across resistor 32. This second function will be discussed more fully in connection with the operation of the timing circuit 40. The amplifier 182 also acts as a buffer to isolate the RC circuit 180, 178 from the remainder of the circuit. Both the buffer amplifier 174 and the buffer amplifier 182 are preferably unity gain amplifiers. The output from amplifier 182 is connected to a resistor 184, which is part of a priority circuit. The output of amplifier 182 is also connected to terminal 186 as is further illustrated in FIG. 4.

The output of amplifier 182 is also connected to terminal 188 of amplifier circuit 190, which is part of the short time delay signal conditioning circuit 42. The amplifier 190 is a non-inverting amplifier having a feedback resistance 192 and input resistors 194, 196, and 198a–198g. The input resistance to amplifier 190 may be adjusted by means of a switch 200 having a wiper arm 202. The switch 200 is connected to selectively short resistors 198a–198g, as desired, in much the same fashion as the operation of switch 170 with respect to resistors 166a–166g. The output of amplifier 190 is connected to a resistor 204, which, in turn, is connected to a resistor 206 and to the positive input terminal 208 of an amplifier 210. Amplifier 210 includes a feedback resistor 212. An additional resistor 214 is provided so that the combination of amplifiers 190 and 210 have an operating characteristic much the same as amplifier 160:

where $V_O$=the output voltage at terminal 216 of amplifier 210

$V_i$=the input voltage at positive terminal 188 of amplifier 190

$R_1$=the input resistance of resistors 194, 196 and 198a–198g as selected by switch 200

$R_2$=fixed feedback resistance 192 so that
$$V_O = +R_2/R_1 V_i$$

Thus, it will be apparent that the short time delay signal conditioning circuit 42 operates to adjust the short time delay rating of the circuit in much the same manner as the long time delay signal conditioning circuit 36 operates to adjust the rating of that circuit. The resistances 194, 196, and 198a–198g are preferably chosen so that the eight discrete positions of switch 200 will enable one to set the short time delay rating at either 3, 4, 5, 6, 7, 8, 9, or 10 times the maximum allowable current in conductors A, B, and C. The output voltage at terminal 216 is connected to the positive terminal 218 of a comparator 220. The negative terminal of comparator 220 is connected to voltage reference terminal 124. Whenever the voltage on terminal 218 exceeds the reference voltage at terminal 124, comparator 220 delivers an output signal to gating terminal 222 of an electronic switch 224. Electronic switch 224 is connected between output terminal 216 of amplifier 210 and a terminal 226 of timing circuit 40 by means of a resistor 228. The output of comparator 220 is also connected to an inverting amplifier 230 whose output is connected to the gating terminal 232 of an electronic switch 233 and to terminal 234 of timing circuit 40. Electronic switches 224 and 233 also form part of the aforementioned priority circuit.

As has further been discussed earlier, substantially all the sensed ground fault current flows through power supply and reference circuit 26 to neutral terminal 28 through resistor 34 to terminal 24 of current and ground fault sensing circuit 18. The voltage developed at terminal 24 is a negative voltage with respect to neutral terminal 28 and is directly proportional to the sensed ground fault current signal. Also connected to resistor 32 is the ground fault signal conditioning circuit 50 including an amplifier circuit for amplifying the ground fault voltage signal to a desired level. The amplifier circuit includes operational amplifier 235 having a fixed feedback resistor 236 and a plurality of input resistors 238, 240, and 240a–240g. The output of operational amplifier 234 is connected to buffer amplifier 242. The buffer amplifier 242 is connected to a diode 244, which, in turn, is connected to an RC circuit including capacitor 246 and resistor 248. A switch 250 having eight discrete positions and a wiper 252 is connected to resistances 240a–240g. The components thus far described in ground fault signal conditioning circuit 50 operate in an identical manner to the components 160–180 in long time delay signal conditioning circuit 36 and thus their operation will not be described again here other than to point out that in the preferred embodiment the resistances 238, 240, and 240a–240g are selected so that the ground fault circuit may activate the circuit mechanism 10 at either 20%, 25%, 30%, 40%, 50%, 60%, 70%, or 75% of rated ground fault current depending on the position of wiper 252 of switch 250.

The output of RC circuit 248, 246 is connected to the positive terminal 254 of a voltage comparator 256. The negative terminal of voltage comparator 256 is connected to voltage reference terminal 124. The output of voltage comparator 256 is connected to the gating terminal 258 of an electronic switch 260. Electronic switch 260 is connected between voltage reference terminal 124 and the input terminal of electronic switch 262. The output of comparator 256 is also connected to an inverting amplifier 264. The output of inverting amplifier 264 is connected to gating terminal 266 of electronic switch 262 and to terminal 268 of timing circuit 40. The electronic switches 224, 233, 260, and 262 are bidirectional gate controlled switching devices, i.e. electronic switches which are rendered conductive when their gates are above a predetermined threshold voltage and nonconductive when their gates are below that threshold voltage; for example, switches generally sold under the model number CD4016.

The switches 224, 233, 260, and 262 form part of a priority circuit for connecting the output terminal of either long time delay signal conditioning circuit 36, short time delay signal conditioning circuit 42, or ground fault signal conditioning circuit 50 to input terminal 226 of timing circuit 40. Assuming the circuit of the present invention is active and the current flowing in conductors A, B, and C is within the normal range of currents or above the normal range but insufficient to activate the short time delay signal conditioning circuit 42, the output of buffer amplifier 182 is connected to resistor 184 and to electronic switch 262. Assuming there is no ground fault overcurrent condition, the output of inverting amplifier 264 will be high, causing gate 266 to render switch 262 conductive. The signal from amplifier 182 will then be delivered to electronic switch 233. Since we are assuming there is no overcurrent condition, the output of inverting amplifier 230 will be high, causing gate 232 to render electronic switch 233 conductive. Accordingly, under these circumstances, the signal from amplifier 182 will be connected to timing circuit input terminal 226.

Assuming now that the conditions in conductors A, B, and C change so that the current flowing in conductors A, B, and C is below the level required to activate the short time delay signal conditioning circuit 42, but that a ground fault condition exists sufficient to activate the ground fault signal conditioning circuit 50, then the comparator 256 will register an output signal sufficient to cause gate 258 to render electronic switch 260 conductive. Accordingly, voltage reference signal 124 will then be connected through switch 260 and resistor 270 to electronic switch 233. Simultaneously, inverting amplifier 264 will produce a negative output signal causing gate 266 to render electronic switch 262 non-conductive. Since the output signal from inverting amplifier 230 remains positive, gate 232 will continue to render electronic switch 233 conductive and the voltage reference signal from terminal 124 will be connected to input terminal 226 of timing circuit 40. In the case of ground fault signal conditioning circuit 50, a voltage reference signal is utilized to activate the timing circuit 40 since predetermined time delays are desirable in ground fault situations.

Next, assuming the current in conductor A, B, or C rises above the level sufficient to activate the short time delay signal conditioning circuit 42, then the output from comparator 220 will cause the gate 222 to render electronic switch 224 conductive, thereby connecting the output of amplifier 210 at terminal 216 to be connected through resistor 228 to terminal 226 of timing circuit 40. Simultaneously, the output of inverting amplifier 230 will become negative, causing gate 232 to render electronic switch 233 non-conductive. The rendering of switch 233 non-conductive seals off access to input terminal 226 of timing circuit 40 from either long time delay signal conditioning circuit 36 or ground fault signal conditioning circuit 50.

Accordingly, it is apparent from the above discussion that short time delay signal conditioning circuit 42 has priority over either ground fault signal conditioning circuit 50 or long time delay signal conditioning circuit 36 in gaining access to input terminal 226 of timing circuit 40. Ground fault signal conditioning circuit 50 has priority over long time delay signal conditioning circuit 36 in gaining access to input terminal 226 of timing circuit 40. Although long time delay signal conditioning circuit 36 is normally connected to input terminal 226, it has the lowest priority of access.

Figure 5:
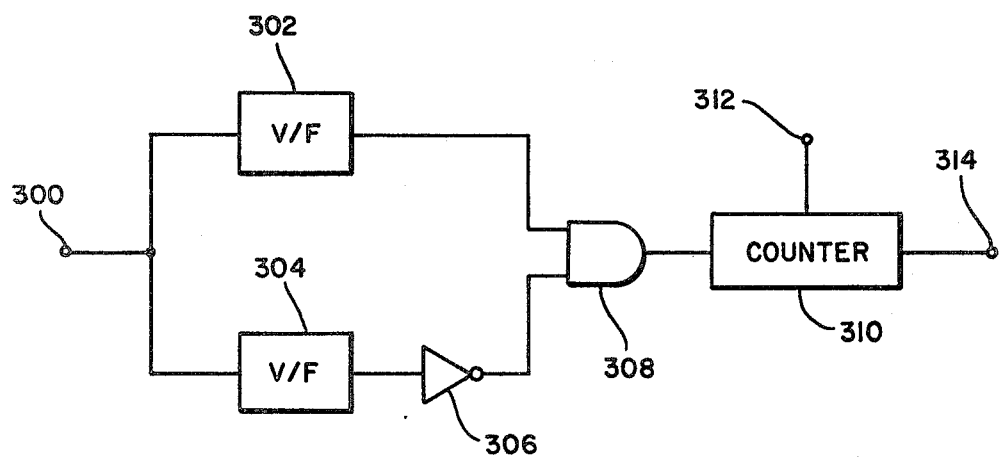
FIG. 5 shows an alternate embodiment of a timing circuit for use in the trip circuit of the present invention.
Figure 5A:
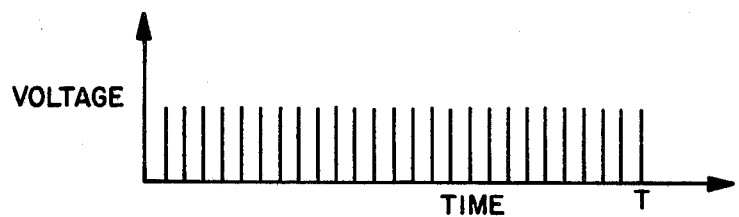
Figure 5B:
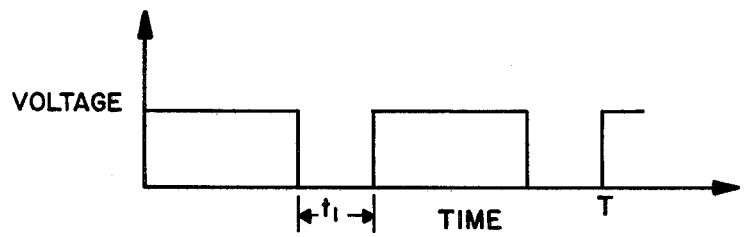
Figure 5C:
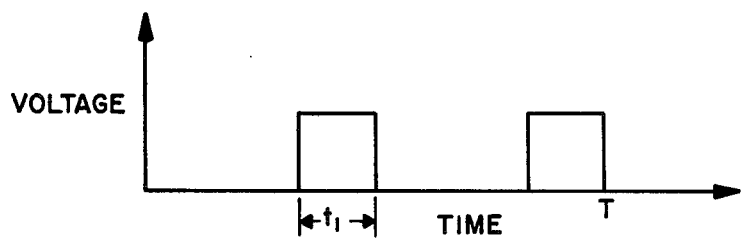

Before describing the preferred embodiment of the timing circuit 40 shown in FIG. 4, two alternate embodiments of the timing circuit of the present invention will be described. FIG. 5 shows an input terminal 300 for receiving an input voltage signal, for example, from one of the circuits 36, 42, or 50. A first voltage-to-frequency converter 302 is connected to the input terminal 300 and is responsive to the magnitude of the voltage of the signal received for producing output pulses having a comparably high frequency, for example, approximately 10 kHz for an input signal of one volt. A second voltage-to-frequency converter 304 is also connected to the input terminal 300 and is responsive to the magnitude of the input voltage received for producing pulses having a second comparatively low frequency for the same input voltage, for example, approximately 0.1 kHz for an input voltage of one volt. An inverter 306 is connected to the output of voltage-to-frequency converter 304. The outputs of voltage-to-frequency converter 302 and inverter 306 are connected to an AND gate 308. The output of the AND gate 308 is connected to a counter 310. The operation of the circuit of FIG. 5 will now be described in conjunction with FIGS. 5A, 5B, 5C, and 5D, wherein FIG. 5A graphically represents a simulated output signal from voltage-to-frequency converter 302; FIG. 5B graphically represents a simulated output signal from voltage-to-frequency converter 304; FIG. 5C graphically represents a simulated output signal from inverter 306; and FIG. 5D graphically represents a simulated output signal from AND gate 308. The voltage-to-frequency converter 302 produces a relatively high number of pulses in a given time T. Over the same period of time, the voltage-to-frequency converter 304 produces relatively few pulses having a fixed time interval $t_1$ therebetween. Thus, over the same period of time, inverter 306 produces relatively few inverted pulses of fixed width $t_1$. The inverted lower frequency pulses from inverter 306 act in conjunction with AND gate 308 as a window for passing through AND gate 308 only those pulses from voltage-to-frequency converter 302 which are delivered to AND gate 308 during the time that an inverted pulse is also received from inverter 306. The output pulses from AND gate 308 are then delivered to counter 310 where they may be counted as soon as counter 10 receives an input signal at terminal 312. When the counter 312 reaches a predetermined count, an output pulse is delivered at terminal 314 to indicate the expiration of a timing cycle. The time that expires while the counter 310 is reaching a predetermined count is inversely proportional to the square of the input voltage at terminal 300. In order to explain the reason for this relationship, assume that a voltage V is applied to input terminal 300. Voltage-to-frequency converter 302 then produces a first number of pulses $n_1$ during time period T. Inverter 306 produces a second number of pulses $n_2$ during time period T, resulting in a number of pulses $n_3$ being delivered by AND gate 308 to counter 310. Next, assume that the voltage at terminal 300 doubles to 2 V. Voltage-to-frequency converter 302 then produces $2n_1$ pulses during the same time period T. Inverter 306 likewise produces $2n_2$ pulses during the time period T, thus quadrupling the number of output pulses from AND gate 304 to $4n_3$. Since the counter 310 counts at a fixed rate and since the pulses $n_3$ have quadrupled in number, the counter 310 will then reach a fixed count in one quarter the period of time as in the first example. It can likewise be seen that merely by adding additional loops similar to voltage-to-frequency converter 304 and inverter 306 the time elapsed before counter 310 delivers an output can be made inversely proportional to the input voltage taken to the nth power.

Figure 5D:
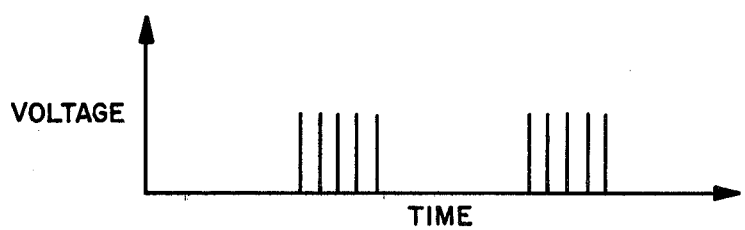
Figure 6:
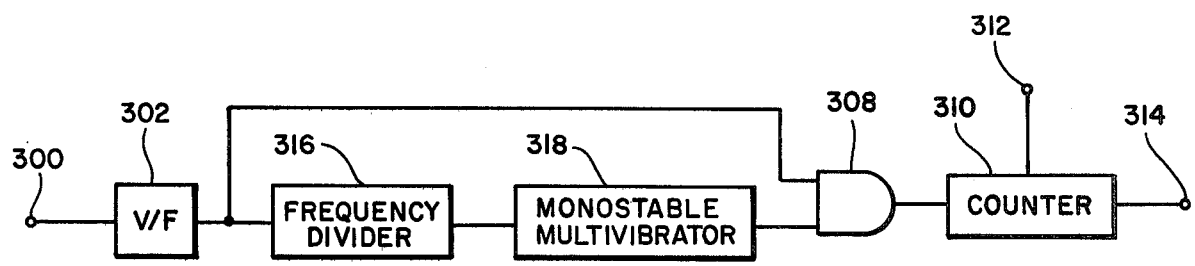
FIG. 6 shows another embodiment of a timing circuit for use with the trip circuit of the present invention.

FIG. 6 shows a second alternate embodiment of the timing circuit 40 of the present invention with like numerals being utilized to identify components that are the same as those illustrated in FIG. 5. The voltage input terminal 300 is connected to the voltage-to-frequency converter 302. The output of voltage-to-frequency converter 302 is connected to AND gate 308 as in the previous embodiment. However, in this embodiment, the voltage-to-frequency converter 304 and the inverter 306 are replaced by connecting a frequency divider 316 to the output of voltage-to-frequency converter 302 and connecting a monostable multivibrator 318 to the output of frequency divider 316. The output of monostable multivibrator 318 is then connected to AND gate 308. The operation of the circuit shown in FIG. 6 is very similar to the circuit shown in FIG. 5 and reference will be made to FIGS. 5A–5D in describing its operation. The voltage-to-frequency converter 302 produces a relatively high number of pulses in a given time T as shown in FIG. 5A. The frequency divider 316 divides the frequency produced by voltage-to-frequency divider 302 to a much lower frequency such as that shown in FIG. 5B. The lower frequency produced by frequency divider 316 triggers monostable multivibrator 318 to thereby produce pulses having a fixed pulse width at the frequency produced by frequency divider 316. These fixed pulse width pulses cooperate with AND gate 308 to create the window effect described in conjunction with FIG. 5. Thus, it is apparent that the circuit of FIG. 6 operates so that the time required for counter 310 to deliver an output signal is inversely proportional to the square of the input voltage.

Referring to FIG. 4, the preferred embodiment of the timing circuit 40, the instantaneous trip circuit 44, the OR gate circuit 48, and the remaining circuit components will be described. Input terminal 226 to timing circuit 40 is connected to a voltage-to-frequency converter 302. The voltage-to-frequency converter 302 is preferably of the type manufactured by Ratheon Corp. under model number RV4132. An RC network consisting of resistors 320, 322, 324, 326, and 328, and capacitors 330, 332, and 334 is connected to the voltage-to-frequency converter 302. The resistors 320, 322, 324 and 326 and the capacitors 332 and 334 are provided for setting the output frequency of converter 302 to the desired level. The capacitor 330 serves as an input filter. The resistor 328 serves as a pull-up resistor for output pulses from converter 302. The output of voltage-to-frequency converter 302 is connected to frequency divider 316, which is preferably a counter of the type manufactured generally under part no. CD4020. A phase shifting RC circuit including resistor 336 and capacitor 338 is connected to the output of frequency divider 316. The output from the phase shifting circuit 336, 338 is connected to the negative terminal of a comparator 340. The positive terminal of comparator 340 is connected to voltage reference terminal 124. The output of comparator 340 is connected to one terminal of NOR gate 342. The other terminal of NOR gate 342 is connected directly to frequency divider 316. The network including the phase shifting circuit 336, 338, the comparator 340, and the NOR gate 342 is the functional equivalent of the monostable multivibrator 318 of the embodiment shown in FIG. 6 and serves to produce pulses of a fixed time duration having a much lower frequency than that produced by the voltage-to-frequency converter 302. FIG. 5A graphically illustrates the frequency of the signal from voltage-to-frequency converter 302; FIG. 5D graphically illustrates the frequency of the signal produced by frequency divider 316; and FIG. 5C graphically illustrates the fixed duration pulses generated by the circuit 336, 338, 340, and 342. The output from voltage-to-frequency converter 302 and the output from NOR gate 342 are connected to a NAND gate 344. The output of NAND gate 344 is connected to an inverter 346, which, in turn, is connected to counter 310. The output from counter 310 is connected to one terminal of an OR gate 348. The reset terminal 312 of counter 310 is connected to a circuit including a comparator 350 and an inverter 352. The positive terminal of comparator 350 is connected to output terminal 186 of long time delay signal conditioning circuit 36. The positive terminal of comparator 350 is connected to voltage reference terminal 124. Another counter 354 has its reset terminal connected to terminal 234 for receiving any output signal from short time delay signal conditioning circuit 42. Counter 354 also has its input terminal connected to the output of voltage-to-frequency converter 302. An output terminal of counter 354 is connected through a resistor 356 to one terminal of an OR gate 358. In the alternative, another output terminal of counter 354 may be connected by means of an optional jumper connection 359 to the same terminal of OR gate 358 should one wish to change the short time delay function to an instantaneous trip function. A third counter 360 has its reset terminal connected to terminal 268 from ground fault signal conditioning circuit 50 for receiving the output signal therefrom. The input terminal of counter 360 is also connected to the output of voltage-to-frequency converter 302. Three of the output terminals of counter 360 are connected to a three position switch 362 including a resistor 364 for selecting any one of three levels of time delay for ground faults. Switch 362 is connected to the other terminal of OR gate 358 and through a resistor 366 to neutral terminal 28. The output terminal of OR gate 358 is connected to the other terminal of OR gate 348. The output of OR gate 348 is connected to one terminal of an OR gate 368. The other terminal of OR gate 368 is connected to instantaneous trip circuit 44, including a comparator 370 having its negative terminal connected to regulated voltage terminal 122 and its positive terminal connected to output terminal 186 of long time delay signal conditioning circuit 36. The output terminal 372 of OR gate 368 is connected to resistor 136 and therefore to the gate of SCR 54. It should be understood that although certain output connections for counters 310, 354, and 360 are illustrated in the preferred embodiment of the present invention, the output count required to yield a trip signal, and thus the timing characteristic of the circuit may be changed by selecting other output connections.

The operation of the timing circuit 40 will now be discussed in conjunction with a summary of the operation of the entire circuit of the present invention. Current in conductors A, B, and C is sensed by current and ground fault sensing circuit 18. A current signal proportional to sensed peak current and sensed ground fault current (if any) is delivered at terminal 20. Power supply and reference circuit 26 then develops, in the first mode of operation, voltage at a first level (approximately 10 volts) at output terminal 112; voltage at a regulated second level (preferably 5 volts) at terminal 122 and a reference voltage (approximately 0.4 volts) at output terminal 124. Current from power supply 26 flows through system neutral terminal 28 and in the case of the sensed current signal through resistor 32 back to terminal 22 and in the case of sensed ground fault current through resistor 34 and back to terminal 24. Switches 170, 200, and 250 may be adjusted when the circuit breaker cover is removed to adjust the desired trip level for long time delay signal conditioning circuit 36, short time delay signal conditioning circuit 42, and ground fault signal conditioning circuit 50, respectively.

Assuming the current flowing in conductors A, B, and C is within normal operating ranges, the long time delay signal conditioning circuit 36 will deliver an output signal at terminal 186 indicative of the level of current flowing in the conductors A, B, and C. The signal at terminal 186, in the absence of overriding signals from either ground fault signal conditioning circuit 50 or short time delay signal conditioning circuit 42, will be delivered to input terminal 226 of timing circuit 40. Timing circuit 40 will develop a pulsed output signal at the output of inverter 346 of the type graphically represented in FIG. 5D. These pulses will be delivered to counter 310, but since counter 310 is inactive, the circuit will not respond further. Simultaneously, the signal at terminal 186 is delivered to comparator 350, which compares the signal to the voltage at reference voltage terminal 124. Assuming once again that the current flowing in conductors A, B, and C is within the normal range of currents, the comparator 350 will not deliver the signal required for activating counter 310 and the circuit will not respond further. It should be further noted that, simultaneously, the signal at terminal 186 is delivered to comparator 370 of instantaneous trip circuit 44 where it is compared to the voltage at terminal 122. However, since the voltage at terminal 122 is significantly higher than the voltage at terminal 124, the comparator 370 will fail to produce the output required to cause OR gate 368 to deliver a gating signal to SCR 54.

Figure 7:
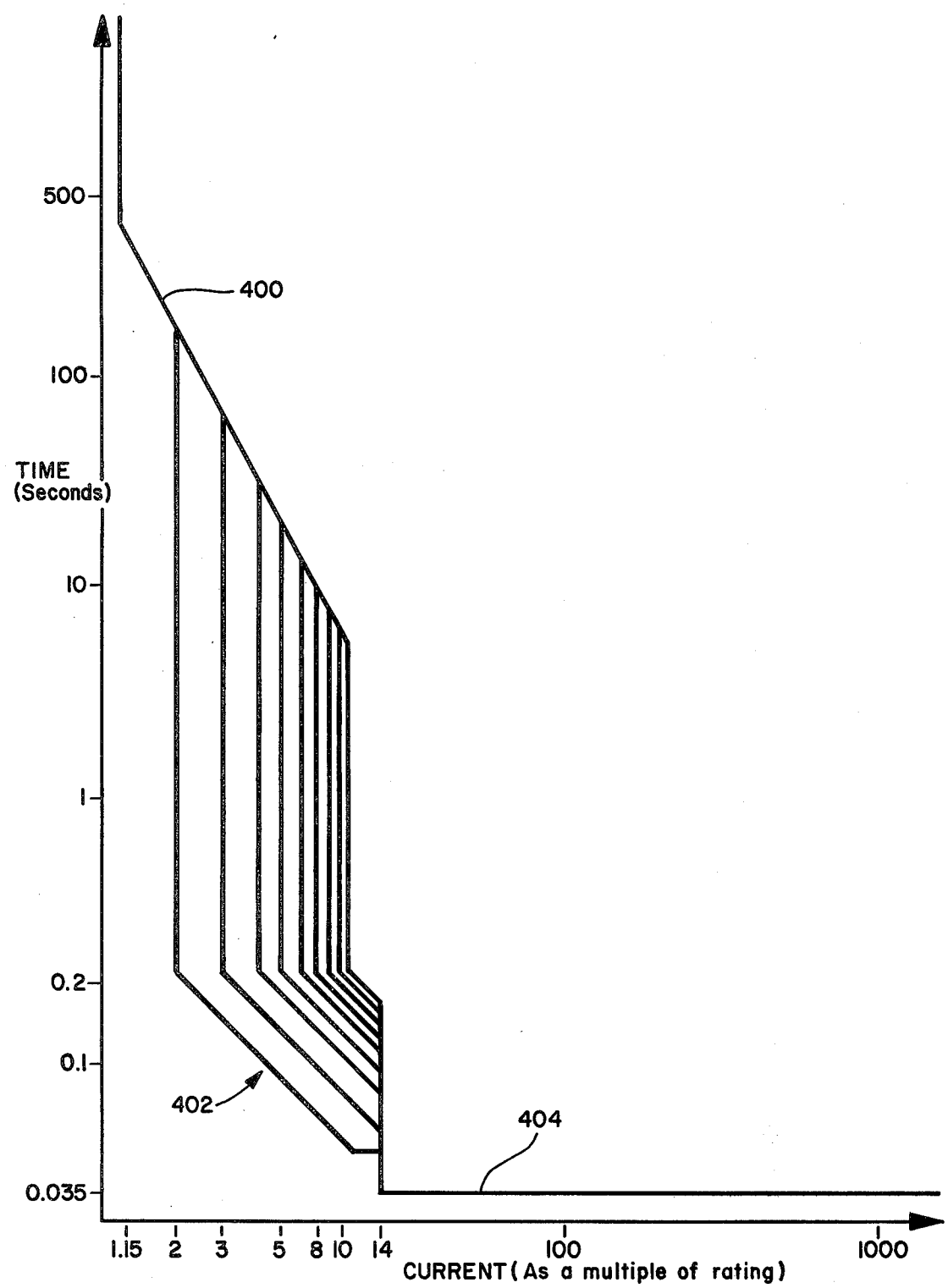
FIG. 7 is a graph illustrating the relationship between peak current and tripping time for the solid state trip circuit of the present invention.

Next, assuming that a fault current develops in conductors A, B, and C, wherein the overcurrent condition is high enough to exceed the rating of the circuit breaker by at least 15% but less than that required to activate the short time delay signal conditioning circuit 42, the circuit will respond in an identical manner to that described above with the exception that the voltage at terminal 186 will now exceed the voltage at terminal 124, causing comparator 350 to deliver an output signal to inverter 352, which, in turn, will activate counter 310 at its reset terminal 312. Counter 310 will then begin counting pulses received from inverter 346. Assuming that after the counter 310 begins its count, but prior to the counter 310 emitting an output signal at terminal 314, the current in conductors A, B, and C temporarily falls within the normal range, the counter 310 will nonetheless continue to be activated for a significant period of time because of the action of capacitor 178 and resistor 180. The capacitor 178, in combination with the resistor 180, will delay a fall in the output signal at terminal 186 in response to a drop in current. Thus, for the period of such delay the comparator 350 will continue to activate timing counter 310. Depending on the level of the overcurrent condition, the counter 310 will complete its count in a period of time which will cause the circuit of the present invention in combination with the contact mechanism 10 to respond as shown in FIG. 7. The output signal from counter 310 will then cause OR gate 348 to deliver an output signal to OR gate 368, which will, in turn, deliver an output signal at terminal 372, causing SCR 54 to be rendered conductive to actuate the circuit mechanism 10.

Next, assuming a ground fault signal develops sufficient to activate ground fault signal conditioning circuit 50, the voltage reference signal from terminal 124 will be connected to input terminal 226 of timing circuit 40. The output pulses from voltage-to-frequency converter 302 are always delivered to counter 360. When a signal is received from inverter 264 at terminal 268, the counter 360 will begin its timing cycle count. As was the case with long time delay signal conditioning circuit 36, any temporary drop in ground fault current will be delayed by the capacitor 246 and resistor 248. When the counter 360 has completed its count, depending on the position of switch 362, its output signal is delivered to OR gate 358. OR gate 358 then causes 348 to deliver an output signal to OR gate 368 and the contact mechanism 10 will be actuated as before.

Next, assuming an overcurrent condition exists which is large enough to activate the short time delay signal conditioning circuit 42 but not yet large enough to activate instantaneous trip circuit 44, the output from amplifier 210 will be delivered to input terminal 226 of timing circuit 40. Since the output of voltage-to-frequency converter 302 is always delivered to counter 354, as soon as a signal is received at terminal 234 from inverter 230, the counter 354 begins its timing count. The counter 354 is designed to introduce a range of time delays, depending on the level of the fault, to cause the circuit of the present invention in combination with the contact mechanism 10 to respond as shown in FIG. 7. When the counter 354 completes its count, its signal is delivered through resistor 356 to OR gate 358 and the circuit of the present invention actuates the contact mechanism 10 as previously discussed.

Finally, in the event that an overcurrent condition exists in conductors A, B, and C which is sufficient to actuate instantaneous trip circuit 44 (approximately 14 times rated current, see FIG. 7) the circuit will respond in the following manner. The output signal at terminal 186 from long time delay signal conditioning circuit 36 will exceed the output voltage at terminal 122, causing comparator 370 to deliver an output signal to OR gate 368. The instantaneous trip circuit 44 responds substantially instantaneously to cause the circuit of the present invention in combination with the contact mechanism 10 to respond as shown in FIG. 7. The contact mechanism 10 will then be actuated, as previously discussed.

FIG. 7 shows the time-current characteristics of the circuit of the present invention with curve 400 illustrating the response characteristics of long time delay circuit 38; curves 402 illustrating the characteristics of short time delay circuit 46 and curve 404 illustrating the characteristic of instantaneous trip circuit 44. The curves 402 are a function of the position of switch 200.

Figure 8:
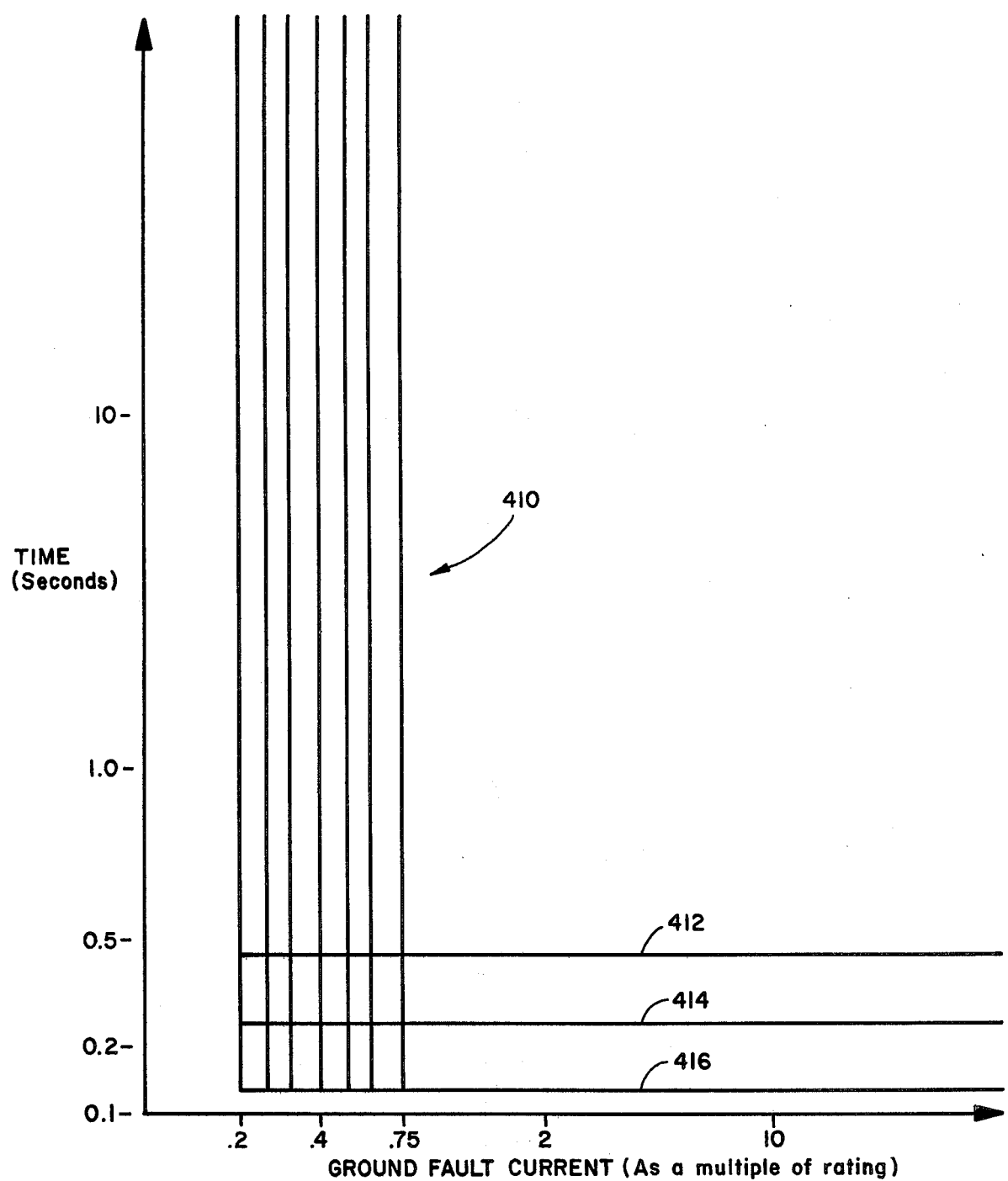
FIG. 8 is a graph illustrating the relationship between peak ground fault current and tripping time for the solid state trip circuit of the present invention.

FIG. 8 shows the time-ground fault current characteristics of the circuit of the present invention with the portions 410 of the curves being a function of the position of switch 250 and the portions 412, 414, and 416 being a function of the position of switch 362.

Accordingly, it is apparent that the electrical circuit of the present invention, by utilizing an extremely accurate circuit configuration for developing a voltage signal proportional to sensed current, does not require any calibration. Furthermore, by utilizing digital circuit technology in the time delay portion of the circuit, the circuit of the present invention provides extremely accurate timing cycles. Finally, the circuit of the present invention utilizes many commercially available components which help to keep the cost of such a circuit down.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

We claim:

1. An electrical circuit for actuating the trip mechanism of a circuit interrupter comprising:
   current sensing means having a pair of output terminals, said current sensing means cooperating with at least one electrical power conductor for sensing the amount of current flowing in said electrical power conductor and producing a sensed current signal indicative thereof;
   a circuit neutral terminal;
   power supply means connected to one of said output terminals of said current sensing means for receiving said sensed current signal therefrom, and also connected to said circuit neutral terminal;
   a resistor connected between said circuit neutral terminal and the other of said output terminals of said current sensing means for developing a voltage signal proportional to said sensed current signal and for returning substantially all of said sensed current signal to the other of said output terminals of said current sensing means; and
   control means responsive to the magnitude of said voltage signal for actuating the trip mechanism of said circuit interrupter when said current flowing in said electrical power conductor exceeds a predetermined level.

2. An electrical circuit as set forth in claim 1, wherein said control means includes an amplifier circuit for amplifying said voltage signal to a desired level.

3. An electrical circuit as set forth in claim 2 wherein said voltage signal is a negative voltage signal and said amplifier circuit includes an inverting amplifier.

4. An electrical circuit as set forth in claim 2, wherein said control means includes means connected to said means for developing a voltage signal for adjusting the gain of said amplifier circuit to thereby provide means for adjusting the level at which said trip mechanism will be actuated.

5. An electrical circuit as set forth in claim 1, further including ground fault current sensing means having a pair of output terminals, said ground fault current sensing means cooperating with said current sensing means for sensing ground fault currents in one or more electrical power conductors and producing a ground fault current signal indicative thereof, one of said output terminals of said ground fault current sensing means being connected to said one of said output terminals of said current sensing means; and
   a second resistor connected between said circuit neutral terminal and the other of said output terminals of said ground fault sensing means for developing a ground fault voltage signal proportional to said sensed ground fault current signal and for returning substantially all of said sensed ground fault current signal to the other of said output terminals of said ground fault sensing means.

6. An electrical circuit as set forth in claim 1, wherein said control means includes an amplifier circuit for amplifying said ground fault voltage signal to a desired level.

7. An electrical circuit as set forth in claim 6 wherein said voltage signal is a negative voltage signal and said amplifier circuit includes an inverting amplifier.

8. An electrical circuit as set forth in claim 6, wherein said control means includes means connected to said means for developing a ground fault voltage signal for adjusting the gain of said amplifier circuit to thereby provide means for adjusting the level at which said trip mechanism will be actuated.

9. An electrical circuit as set forth in claim 1, wherein substantially all of said sensed current signal continuously flows through said means for developing a voltage signal whenever current is flowing in said electrical power conductor.

10. An electrical circuit as set forth in claim 1, wherein said power supply means includes means for producing a reference voltage signal and wherein said control means is responsive to the magnitudes of both said voltage and said reference voltage for actuating the trip mechanism of said circuit interrupter.

11. An electrical circuit as set forth in claim 1, wherein said power supply means includes means for producing output power at a first voltage level during a first mode of operation of said electrical circuit and producing output power at a second voltage level during a second mode of operation of said electrical circuit, said second voltage level being substantially higher than said first voltage level.

12. An electrical circuit for actuating the trip mechanism of a circuit interrupter comprising:
   current sensing means cooperating with at least one electrical power conductor for sensing the amount of current flowing in said electrical power conductor and producing a sensed current signal indicative thereof;
   a power supply circuit electrically connected to said current sensing means for receiving said sensed current signal and for deriving power therefrom; said power supply producing output power at a first voltage level during a first mode of operation of said electrical circuit and producing output power at a second voltage level during a second mode of operation of said electrical circuit, said second voltage level being at least approximately four times higher than said first voltage level;
   means for developing a voltage signal proportional to said sensed current signal; and
   control means responsive to the magnitude of said voltage signal for actuating the trip mechanism of said circuit interrupter when said current flowing in said electrical power conductor exceeds a predetermined level, said control means being connected to said power supply circuit for receiving said output power at said first voltage level during said first mode of operation, and said control means being connected to said power supply circuit for receiving said output power at said second voltage level during said second mode of operation.

13. An electrical circuit as set forth in claim 12, wherein said control means includes a signal conditioning circuit for producing a modified voltage signal, a timing circuit for producing a trigger signal a predetermined time after the delivery of said modified voltage signal to said timing circuit provided said modified voltage signal exceeds said predetermined level, a switch means for receiving said trigger signal from said timing circuit and a magnetic latch in series with said switch means and said current sensing means for actuating the trip mechanism of said circuit interrupter, said signal conditioning and timing circuits being connected to said power supply circuit to receive power at said first voltage level only during said first mode of operation of said electrical circuit and wherein said switch means and said magnetic latch are connected to said power supply circuit to receive power at said second voltage level only during said second mode of operation of said electrical circuit.

14. An electrical circuit as set forth in claim 13, wherein said power supply circuit further includes voltage regulator means connected to receive output power at said first voltage level for producing a regulated output voltage signal at a third voltage level.

15. An electrical circuit as set forth in claim 14, wherein said control means further includes an instantaneous trip circuit responsive to said regulated voltage signal and said modified voltage signal for delivering a trigger signal to said switch means whenever said modified voltage signal exceeds said third voltage level.

16. An electrical circuit as set forth in claim 14, wherein said power supply circuit further includes a voltage divider circuit connected to said regulated voltage signal for producing a reference voltage at a fourth voltage level.

17. An electrical circuit as set forth in claim 16, wherein said signal conditioning and timing circuits are connected to said voltage divider circuit to receive said reference voltage signal during said first mode of operation of said electrical circuit.

18. An electrical circuit as set forth in claim 12, wherein said power supply circuit further includes first circuit means for producing said output power at said first voltage level, said first circuit means including first switching means connected to said current sensing means and a first zener diode connected in series with said first switching means, said first switching means being biased to the conductive state during said first mode of operation of said electrical circuit and said first switching means being biased to a nonconducting state during said second mode of operation of said electrical circuit.

19. An electrical circuit as set forth in claim 18, wherein said power supply circuit further includes second circuit means for producing output power at said second voltage level, said second circuit means including a second zener diode connected to said current sensing means and connected in parallel with the series combination of said first switching means and said first zener diode, said second zener diode thereby being shunted by said first switching means and said first zener diode during said first mode of operation of said electrical circuit and said second circuit means thereby providing power at said second voltage level during said second mode of operation of said electrical circuit.

20. An electrical circuit as set forth in claim 19, wherein said power supply circuit further includes a third circuit means connected to said current sensing means and in parallel with both said first and second circuit means for shunting excess current away from said first circuit means in said first mode of operation and away from said second circuit means in said second mode of operation.

21. An electrical circuit as set forth in claim 20, further including a resistive network common to both said first and second circuit means and wherein said third circuit means includes a Darlington pair of transistors having their bases connected to said resistive network to thereby bias said Darlington pair of transistors to the conductive state whenever current flows in either said first or second circuit means.

22. An electrical circuit as set forth in claim 16, wherein said current sensing means further includes ground fault current sensing means cooperating with at least one electrical power conductor for sensing ground fault currents and producing a ground fault current signal indicative thereof, said ground fault current signal being a component of said sensed current signal for delivery to said power supply circuit; and wherein said means for developing a voltage signal proportional to said sensed current signal includes means for developing a ground fault voltage signal proportional to said ground fault current signal.

23. An electrical circuit as set forth in claim 22, wherein said signal conditioning circuit includes means for producing a modified ground fault voltage signal.

24. An electrical circuit as set forth in claim 12, wherein said power supply circuit further includes voltage regulator means connected to receive output power at said first voltage level for producing a regulated output voltage signal at a third voltage level.

25. An electrical circuit as set forth in claim 24, wherein said power supply circuit further includes a voltage divider circuit connected to said regulated voltage signal for producing a reference voltage at a fourth voltage level.

26. An electrical circuit as set forth in claim 12, wherein said first voltage level is approximately ten volts and said second voltage level is approximately forty volts.

27. An electrical circuit as set forth in claim 12, wherein said current sensing means further includes ground fault sensing means cooperating with at least one electrical power conductor for sensing ground fault current and producing a ground fault current signal indicative thereof, said ground fault current signal being a component of said sensed current signal for delivery to said power supply circuit; and wherein said means for developing a voltage signal proportional to said sensed current signal includes means for developing a ground fault voltage signal proportional to said ground fault current signal.

28. An electrical circuit for actuating the trip mechanism of a circuit interrupter comprising:
current sensing means cooperating with at least one electrical power conductor for sensing the amount of current flowing in said electrical power conductor and producing a sensed current signal indicative thereof;

power supply means for receiving said sensed current signal and for deriving power therefrom;

means for developing a voltage signal proportional to said sensed current signal;

control means connected to said power supply means for receiving power therefrom and responsive to the magnitude of said voltage signal for actuating the trip mechanism of said circuit interrupter when said current flowing in said electrical power conductor exceeds a predetermined level, said control means including a first amplifier circuit for amplifying said voltage signal to a desired level, said first amplifier circuit including input and output terminals and means for changing the gain of said first amplifier circuit to thereby adjust the level at which said trip mechanism will be actuated;

said control means further including a second amplifier circuit connected to the output of said first amplifier circuit for amplifying the output of said first amplifier circuit to a desired level, said second amplifier circuit including input and output terminals and means for changing the gain of said second amplifier circuit to thereby adjust another level at which said trip mechanism will be actuated;

a ground fault current sensing means cooperating with said current sensing means for sensing ground fault currents in one or more electrical power conductors and producing a ground fault current signal indicative thereof, and means for developing a ground fault voltage signal proportional to said sensed ground fault current signal, said control means further including a third amplifier circuit for amplifying said ground fault voltage signal to a desired level, said third amplifier circuit including input and output terminals and means for changing the gain of said third amplifier circuit to thereby adjust the level at which said trip mechanism will be actuated;

said control means further including a timing circuit having input and output terminals and a priority circuit connected to said first, second and third amplifier circuits for determining which of of the output terminals of said first, second and third amplifier circuits will be connected to the input terminal of said timing circuit.

29. An electrical circuit as set forth in claim 28, wherein said means for changing the gain of said first, second and third amplifier circuits are variable resistance networks included in said first, second and third amplifier circuits.

30. An electrical circuit as set forth in claim 29, wherein each of said amplifier circuits includes an input resistance and a feedback resistance and wherein said variable resistance network is included in said input resistance.

31. An electrical circuit as set forth in claim 29, wherein each of said amplifier circuits includes an input resistance and a feedback resistance and wherein said variable resistance network is included in said feedback resistance.

32. An electrical circuit as set forth in claim 28, wherein said priority circuit includes means for connecting the output terminal of said first amplifier circuit to the input terminal of said timing circuit when the voltages at the output terminals of said second and third amplifier circuits are below predetermined threshold levels;

means for disconnecting said first amplifier circuit from said input terminal of said timing circuit and for connecting a signal from said third amplifier circuit to the input terminal of said timing circuit when the voltage at the output terminal of said third amplifier circuit is above a predetermined threshold level and the voltage at the output terminal of said second amplifier circuit is below a predetermined threshold level; and means for disconnecting said first and third amplifier circuits from the input terminal of said timing circuit and connecting the output terminal of said second amplifier circuit to the input terminal of said timing circuit when the voltage at the output terminal of said second amplifier circuit is above a predetermined threshold level.

33. An electrical circuit as set forth in claim 32, wherein said priority circuit includes a plurality of electronic switches for connecting and disconnecting said first, second and third amplifiers from said input terminal of said timing circuit.

34. An electrical circuit as set forth in claim 28, wherein said timing circuit includes:

first signal producing means responsive to the magnitude of the voltage of the signal received at said input terminal of said timing circuit for producing pulses having a first frequency;

second signal producing means responsive to the magnitude of the voltage of the signal received at said input terminal of said timing circuit for producing pulses having a second frequency;

gate circuit means connected to said first and second signal producing means for producing output pulses only when receiving pulses from both said first and second signal producing means; and first counting means connected to said gate circuit means for counting the number of said output pulses whenever the magnitude of the voltage of said input terminal exceeds a predetermined level.

35. An electrical circuit as set forth in claim 34, wherein said control means includes a level detecting circuit connected to the output terminal of said first amplifier circuit and said first counting means for causing said first counting means to begin counting the number of said output pulses when the voltage at the output terminal of said first amplifier circuit exceeds a predetermined reference level, thereby initiating a timing cycle for said timing circuit.

36. An electrical circuit as set forth in claim 35, wherein said timing circuit further includes second counting means connected to said first signal producing means and to the output terminal of said second amplifier circuit for counting the number of said pulses at said first frequency whenever an output signal is received from said second amplifier circuit.

37. An electrical circuit as set forth in claim 36, wherein said timing circuit further includes third counting means connected to said first signal producing means and the output terminal of said third amplifier circuit for counting the number of said pulses at said first frequency whenever an output is received from said third amplifier circuit.

38. An electrical circuit as set forth in claim 37, wherein said control means further includes a switch means for receiving a trigger signal from said timing circuit and a magnetic latch in series with said switch means and said current sensing means for actuating the trip mechanism of said circuit interrupter; and an instantaneous trip circuit responsive to the output of said first amplifier circuit for bypassing said timing circuit and delivering a trigger signal to said switch means whenever the voltage at the output terminal of said first amplifier circuit exceeds a predetermined level.

39. An electrical circuit as set forth in claim 38, wherein each of said first, second and third counting means includes means for producing said trigger signal whenever the count in said first, second and third counting means exceeds a predetermined amount.

40. An electrical circuit as set forth in claim 34, wherein the time required for said first counting means to reach a predetermined count is inversely proportional to the voltage of the signal received at said input terminal of said timing circuit taken to the nth power, where n is an integer equal to or greater than two.

41. An electrical circuit as set forth in claim 40, wherein the time required for said counting means to reach a predetermined count is inversely proportional to the square of the voltage of the signal received at said input terminal of said timing circuit.

42. An electrical circuit as set forth in claim 28, wherein said third amplifier circuit includes delay means for delaying the decay in the level of the output voltage from said third amplifier circuit in response to a drop in said ground fault voltage signal.

43. An electrical circuit as set forth in claim 42, wherein said delay means includes an R-C circuit.

44. An electrical circuit as set forth in claim 28, wherein said first amplifier circuit includes delay means for delaying the decay in the level of the output voltage from said first amplifier circuit in response to a drop in said voltage signal.

45. An electrical circuit as set forth in claim 44, wherein said delay means includes an R-C circuit.

46. An electrical circuit as set forth in claim 28, wherein said first amplifier circuit includes an input resistance and a feedback resistance and wherein said means for changing the gain of said first amplifier circuit includes means for varying said input resistance.

47. An electrical circuit as set forth in claim 28, wherein said first amplifier circuit includes an input resistance and a feedback resistance and wherein said means for changing the gain of said first amplifier circuit includes means for varying said feedback resistance.

48. A digital timing circuit comprising:
an input terminal;
first signal producing means responsive to the magnitude of the voltage of a signal received at said input terminal for producing pulses having a first frequency;
second signal producing means responsive to the magnitude of the voltage of the signal received at said input terminal for producing pulses having a second frequency;
gate circuit means connected to said first and second signal producing means for producing output pulses only when receiving pulses from both said first and second signal producing means; and
counting means connected to said gate circuit means and responsive to an external control signal for counting the number of said output pulses and for delivering a signal indicative of the passage of a predetermined amount of time, wherein the time required for said counting means to reach a predetermined count is inversely proportional to the magnitude of the voltage of said signal received at said input terminal taken to the nth power, where n is an integer equal to or greater than two.

49. A digital timing circuit as set forth in claim 48, wherein said first signal producing means includes a voltage-to-frequency converter.

50. A digital timing circuit as set forth in claim 49, wherein said second signal producing means includes another voltage-to-frequency converter and an inverter circuit connected in series therewith for producing pulses at said second frequency, said second frequency being substantially lower than said first frequency.

51. A digital timing circuit as set forth in claim 49, wherein said second signal producing means includes a frequency divider connected to the output of said first signal producing means and a monostable multivibrator connected in series with said frequency divider for producing pulses at said second frequency, said second frequency being substantially lower than said first frequency.

52. A digital timing circuit as set forth in claim 49, wherein said second signal producing means includes a frequency divider connected to the output of said first signal producing means, a phase shifting circuit connected in series with said frequency divider, a comparator connected to the output of said phase shifting circuit for comparing the output of said phase shifting circuit to a reference voltage and producing an output signal whenever the output of said phase shifting circuit exceeds said reference voltage, and a NOR gate circuit connected to the output of said comparator and the output of said frequency divider for producing output pulses at said second frequency.

53. A digital timing circuit as set forth in claim 48, wherein said gate circuit means includes an AND gate circuit connected to both said first and second signal producing means to receive output pulses therefrom at said first and second frequencies and an inverter circuit connected in series with said AND gate circuit.

54. A digital timing circuit as set forth in claim 53, wherein said counting means includes a counter connected to the output of said inverter circuit, said counter producing said signal indicative of the passage of a predetermined amount of time whenever the capacity of said counter is exceeded.

55. A digital timing circuit as set forth in claim 48, wherein said second signal producing means includes means for producing pulses having a fixed time duration.

56. A digital timing circuit as set forth in claim 48, wherein the time required for said counting means to reach a predetermined count is inversely proportional to the square of the magnitude of the voltage of said signal received at said input terminal.

57. An apparatus for interrupting a current flowing in a circuit comprising:
a pair of electrical contacts in series with said electrical conductor;
an electrical contact mechanism including a mechanical trip mechanism for opening and closing said electrical contacts; and
an electrical circuit for actuating said contact mechanism and including:
current sensing means having a pair of output terminals, said current sensing means cooperating with at least one electrical power conductor for sensing the amount of current flowing in said electrical power conductor and producing a sensed current signal indicative thereof;

a circuit neutral terminal;

power supply means connected to one of said output terminals of said current sensing means for receiving said sensed current signal therefrom, and also connected to said circuit neutral terminal;

a resistor connected between said circuit neutral terminal and the other of said output terminals of said current sensing means for developing a voltage signal proportional to said sensed current signal and for returning substantially all of said sensed current signal to the other of said output terminals of said current sensing means; and control means responsive to the magnitude of said voltage signal for actuating the trip mechanism of said circuit interrupter when said current flowing in said electrical power conductor exceeds a predetermined level.

* * * * *